(12) United States Patent
Chai et al.

(10) Patent No.: US 11,866,803 B2
(45) Date of Patent: Jan. 9, 2024

(54) TREATMENT SYSTEM AND METHOD FOR DEEP UTILIZATION OF DOLOMITE RESOURCES

(71) Applicant: Central South University, Changsha (CN)

(72) Inventors: Liyuan Chai, Changsha (CN); Qingwei Wang, Changsha (CN); Xiaobo Min, Changsha (CN); Qingzhu Li, Changsha (CN); Meiqing Shi, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 18/072,329

(22) Filed: Nov. 30, 2022

(65) Prior Publication Data
US 2023/0203620 A1 Jun. 29, 2023

Related U.S. Application Data

(63) Continuation of application No. PCT/CN2022/086671, filed on Apr. 13, 2022.

(30) Foreign Application Priority Data

Dec. 24, 2021 (CN) .......................... 202111595493.4

(51) Int. Cl.
*C22B 26/00* (2006.01)
*C22B 26/22* (2006.01)
*C22B 1/02* (2006.01)

(52) U.S. Cl.
CPC ................. *C22B 26/22* (2013.01); *C22B 1/02* (2013.01)

(58) Field of Classification Search
CPC .................................. C22B 26/22; C22B 1/02
USPC .......................................................... 423/169
See application file for complete search history.

(56) References Cited

FOREIGN PATENT DOCUMENTS

| CN | 108529653 A | 9/2018 |
| CN | 110357138 | 10/2019 |
| CN | 113548814 A | 10/2021 |

*Primary Examiner* — Steven J Bos
(74) *Attorney, Agent, or Firm* — Nitin Kaushik

(57) ABSTRACT

The invention provides a complete set of treatment system and method for deep utilization of dolomite resources. The system includes a primary calcination device, a carbon dioxide capture device, a digestion device, a carbonization separation device, a pyrolysis device and a secondary calcination device; the primary calcination device includes a dolomite calciner, a plurality of hoardings and an exhaust pipe, and an exhaust chamber is formed between the hoardings, the top of the dolomite calciner and the outer wall of the blanking bin; the exhaust chamber is in communication with the carbon dioxide capture device through the exhaust pipe; the carbonization separation device includes a carbonization reaction tank whose gas inlet is in communication with the gas outlet of the carbon dioxide capture device; and the pyrolysis device includes a pyrolysis kettle and a vacuum pump which maintains a negative pressure state in the pyrolysis kettle.

6 Claims, 5 Drawing Sheets a. primary calcination device
c. cooling water after absorbing heat
e. calcine white
g. digestion emulsion
i. carbonization separation device
k. recovery system
m. pyrolysis device
o. secondary calcination device
p. magnesium oxide b. carbon dioxide
d. decomposition mother liquor
f. digestion device
h. calcium carbonate
j. carbon dioxide capture device
l. heavy magnesium water
n. magnesium carbonate

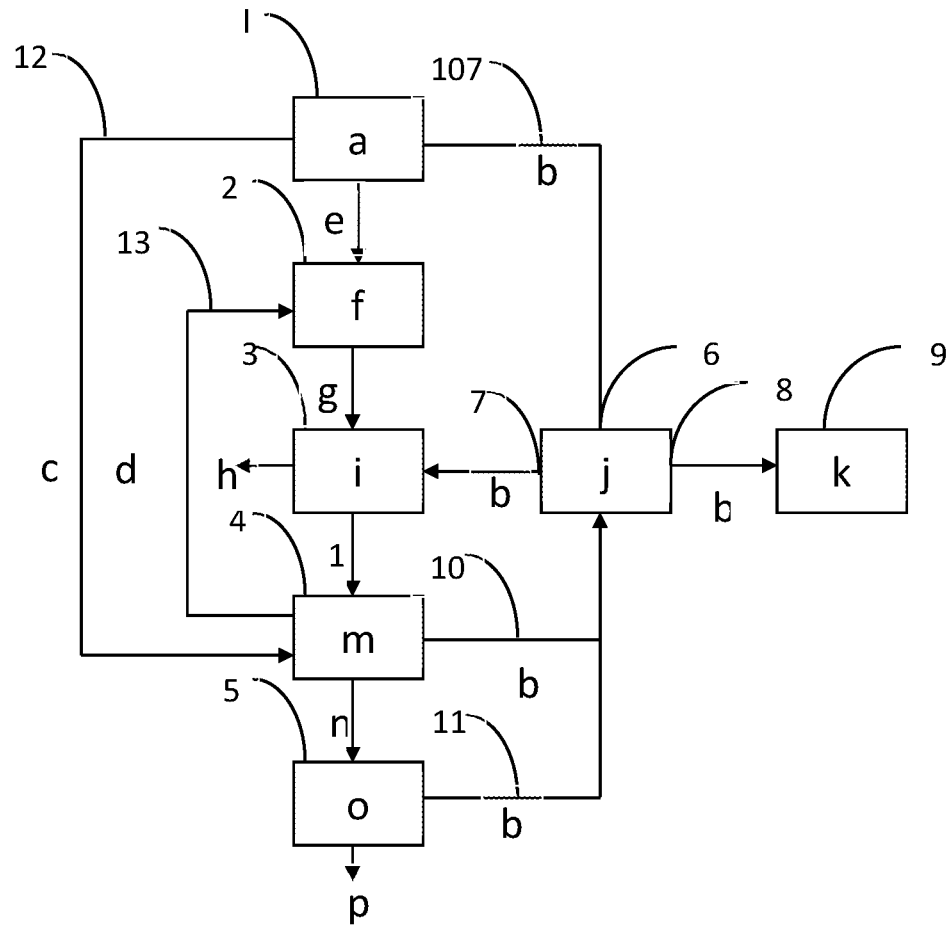

a. primary calcination device
c. cooling water after absorbing heat
e. calcine white
g. digestion emulsion
i. carbonization separation device
k. recovery system
m. pyrolysis device
o. secondary calcination device
p. magnesium oxide b. carbon dioxide
d. decomposition mother liquor
f. digestion device
h. calcium carbonate
j. carbon dioxide capture device
l. heavy magnesium water
n. magnesium carbonate

FIG. 1

TREATMENT SYSTEM AND METHOD FOR DEEP UTILIZATION OF DOLOMITE RESOURCES

REFERENCE TO RELATED APPLICATIONS

The application claims priority to Chinese patent application No. 202111595493.4, filed on Dec. 24, 2021, the entire contents of which are incorporated herein by reference.

TECHNICAL FIELD

The invention relates to the processing of dolomite, and in particular to a complete set of treatment system and method for deep utilization of dolomite resources.

BACKGROUND

Dolomite is an important calcium and magnesium resource. There are mainly carbonization method, acidolysis method, ammonium leaching method and halogenation method for obtaining calcium and magnesium materials from dolomite, the carbonization method of which is particularly valued for its low production cost and stable production process.

The basic process for dolomite carbonization method includes: crushing and then calcining dolomite ore to obtain active calcium oxide and magnesium oxide; transferring the calcined powder after digestion and impurity removal to a carbonization tower; after carbon dioxide is introduced, performing firstly the precipitation reaction of calcium hydroxide in the digestion solution to generate calcium carbonate; with the continuous introduction of carbon dioxide, converting magnesium hydroxide into soluble magnesium bicarbonate; when magnesium hydroxide is completely converted, stopping carbonization and filtering reaction solution, with the filtrate being heavy magnesium water, namely magnesium bicarbonate solution, and with the filter residue being calcium carbonate containing impurities; pyrolyzing the above filtrate (heavy magnesium water) to obtain basic magnesium carbonate precipitation, and calcining the basic magnesium carbonate precipitation to obtain magnesium oxide.

For example, the Chinese invention patent with the publication number CN105271845B discloses a method for preparing high-performance magnesium oxide for silicon steel from dolomite, in which dolomite is first calcined and is combined with water, then is carbonized in a carbonization tower, and subsequently is filtered to separate solid calcium carbonate from magnesium bicarbonate aqueous solution; the obtained magnesium bicarbonate aqueous solution is pyrolyzed and filtered to obtain magnesium carbonate which is then calcined step by step; and after air flow crushing and packaging, high-performance magnesium oxide for silicon steel is obtained. Although high-performance magnesium oxide for silicon steel is obtained by processing the dolomite through the carbonization method in the patent, the performance improvement is obtained by multiple times of calcination and purification, without flue gas containing high-purity carbon dioxide obtained in the dolomite calcination process, thereby increasing resource waste and energy consumption in the whole processing process.

For another example, the Chinese invention patent with the publication number of CN103145166B discloses a method for separating calcium from magnesium in the dolomite carbonization process, in which carbon dioxide is introduced into digestion emulsion until a pH of 12.5-9.5 to obtain a preliminary carbonization system; acetylacetone is added to the primary carbonization system to be mixed to obtain a mixed system; carbon dioxide is introduced into the mixed system until a pH of 9.5-7.5 to generate calcium carbonate solid, and the solid is separated out, with the liquid phase being refined heavy magnesium water, thereby realizing the efficient separation of calcium from magnesium. However, the technical solution of this patent uses additionally acetylacetone, which increases the cost; and in addition, acetylacetone is a toxic substance.

The core problem of dolomite carbonization method is from the incomplete separation of calcium from magnesium. It is very difficult to obtain high-purity calcium and magnesium separation products without subsequent purification. Firstly, the dolomite calcination in a traditional dolomite carbonization method mostly adopts direct calcination; and the use of coke and fuel gas usually introduces sulfur and other metal ions, which has a great impact on the quality of subsequent calcium and magnesium products, and will result in the cost and difficulty of carbon dioxide recovery in the flue gas at the same time. Secondly, in the carbonization process, there is still calcium with a certain solubility in heavy magnesium water; and in the pyrolysis process of heavy magnesium water, there is still a small amount of calcium carbonate precipitation and magnesium carbonate precipitation coexisting due to the presence of calcium and carbon dioxide.

Therefore, how to improve the complete separation of calcium from magnesium in dolomite resource utilization and reduce the energy consumption in dolomite resource utilization process is a technical problem that needs to be solved urgently at present. In view of this, it is necessary to provide a complete set of treatment system and method for deep utilization of dolomite resources to solve or at least alleviate the above technical defects of incomplete separation of calcium from magnesium, low carbon dioxide purity in flue gas, and high resource waste and energy consumption.

SUMMARY

The main purpose of the invention is to provide a complete set of treatment system and method for deep utilization of dolomite resources, aiming to solve the technical problems in the prior art of too long process, high energy consumption, low resource utilization and incomplete separation of calcium from magnesium.

To realize the above purpose, the invention provides a complete set of treatment system for deep utilization of dolomite resources, including a primary calcination device, a carbon dioxide capture device, a digestion device, a carbonization separation device, a pyrolysis device and a secondary calcination device; wherein the primary calcination device includes a dolomite calciner performing the indirect calcination treatment of dolomite, a plurality of hoardings and an exhaust pipe; an exhaust chamber is formed in a surrounding way between the hoardings, the top of the dolomite calciner and the outer wall of a blanking bin; the feed port of the dolomite calciner, the blanking port of the blanking bin and the exhaust port of the dolomite calciner are all in communication with the exhaust chamber which is in communication with the gas inlet of the carbon dioxide capture device through the exhaust pipe;

the carbon dioxide capture device includes a first gas outlet, a second gas outlet, a recovery system, a first recovery pipeline and a second recovery pipeline, and the second gas outlet is in communication with the recovery system;

the carbonization separation device includes a carbonization reaction tank whose gas inlet is in communication with the carbon dioxide capture device through the first gas outlet;

the pyrolysis device includes a pyrolysis kettle and a vacuum pump, the vacuum pump is in communication with the pyrolysis kettle, and the first recovery pipeline is in communication with the gas outlet of the pyrolysis kettle and the gas inlet of the carbon dioxide capture device; wherein the decomposition mother liquor after the pyrolysis reaction in the pyrolysis device returns to the liquid inlet of the digestion device through a decomposition mother liquor return pipeline; and the secondary calcination device includes a secondary calciner whose flue gas outlet is in communication with the gas inlet of the carbon dioxide capture device through the second recovery pipeline.

Further, the dolomite calciner includes a blanking bin, a furnace body and material discharge bins sequentially provided from top to bottom;

wherein the furnace body is covered with a thermal insulation layer on its outer wall; the blanking bin is provided above the feed port of the furnace body; the blanking port of the blanking bin is correspondingly provided through the feed port; the blanking port has a smaller size than the feed port; the feed port is used simultaneously as the exhaust port of the furnace body; and the exhaust chamber is formed between the outer wall of the furnace body and the outer wall of the blanking bin through being surrounded by the hoardings, and the exhaust chamber is in communication with the interior of the furnace body through the feed port.

Further, the material discharge bins are provided with circulating water cooling assemblies on their outer walls; and the hot water outlets of the circulating water cooling assemblies are in communication with the water bath hot water inlet of the pyrolysis kettle through a circulating water return pipeline, and the heated circulating water is used for heat supply to the pyrolysis kettle.

Further, the carbonization reaction device includes the carbonization reaction tank, a gas-liquid mixing reactor and a circulating pump;

the carbonization reaction tank is provided with a feeding port and a gas circuit circulation outlet at its top, and is provided with a water circuit circulation outlet and a drain port at its bottom; and a drain valve is installed at the drain port;

the gas-liquid mixing reactor includes a gas-liquid mixing tube, a feed tube and a gas jet tube; wherein the gas-liquid mixing tube is installed inside the carbonization reaction tank, and is provided with a gas jet tube installation port in its side wall upper part; and the lower end of the gas-liquid mixing tube is configured to be in communication with the interior of the carbonization reaction tank;

the feed tube sequentially passes through the top of the carbonization reaction tank and a seal from top to bottom, and then extends into the interior of the gas-liquid mixing tube; and the material outlet of the feed tube is located below the gas jet tube installation port;

the gas inlet of the gas jet tube is simultaneously in communication with the first gas outlet and the gas circuit circulation outlet, and the exhaust port of the gas jet tube is installed at the gas jet tube installation port; and the liquid inlet of the circulating pump is in communication with the water circuit circulation outlet, and the liquid outlet of the circulating pump is in communication with the feed port of the feed tube.

Further, the gas-liquid mixing reactor further includes a convection mixing jet tube which is in communication with the outlet of the gas-liquid mixing tube and the carbonization reaction tank, the convection mixing jet tube is provided below the gas-liquid mixing tube, and the convection mixing jet tube is provided with a forward flow mixer and a reverse flow mixer sequentially from top to bottom.

Further, the pyrolysis kettle is provided with a helical ribbon agitator preventing material deposition and wall attachment.

Further, the carbon dioxide capture device further includes a compression temporary storage gas tank assembly and a carbon dioxide circulation subsystem;

the gas inlet of the compression temporary storage gas tank assembly is in communication with the exhaust chamber through the exhaust pipe, and the compression temporary storage gas tank assembly includes the first gas outlet and the second gas outlet;

the carbon dioxide circulation subsystem includes a gas transmission pipeline, a first recovery pipeline, a second recovery pipeline, a carbon dioxide water vapor recovery pipeline and a gas-liquid separator; and wherein the carbon dioxide water vapor recovery pipeline is in communication with the flue gas outlet of the pyrolysis kettle and the gas inlet of the gas-liquid separator, and the gas outlet of the gas-liquid separator is in communication with the gas inlet of the carbon dioxide capture device.

The invention further provides a method for utilization of dolomite resources by adopting the complete set of treatment system for deep utilization of dolomite resources according to any one of the above solutions.

Further, the method further comprises the following step: when dolomite in the primary calcination device is heated to 600-700° C., starting the carbon dioxide capture device to recover and recycle carbon dioxide.

Further, the method further includes one or more of the following steps:

adding inhibitor to the digestion device, wherein the inhibitor includes one or more of ethylene diamine tetraacetic acid, sodium hexametaphosphate, polyacrylic acid, hydrolyzed polymaleic anhydride and nitrilotriacetic acid;

adding dispersant to calcium-containing heavy magnesium aqueous solution, wherein the dispersant includes one or more of methanol, alcohol, glycerin, polyacrylamide, cellulose derivatives and water glass;

wherein the solid-liquid ratio of the calcined white to the water or the decomposition mother liquor in the digestion device is 1 kg: 10-30 L;

digesting the first batch of calcined white in the digestion device with 50-80° C. water, and digesting other batches of calcined white with the uncooled decomposition mother liquor;

maintaining a negative pressure state in the pyrolysis kettle, so that the boiling point of calcium-containing heavy magnesium aqueous solution in the pyrolysis kettle is between the pyrolysis temperature of magnesium bicarbonate and the pyrolysis temperature of calcium bicarbonate.

The invention has the following advantages over the prior art:

1. The invention can separate calcium from magnesium more completely to obtain high-purity light calcium carbonate and light magnesium oxide. A first one of products, light calcium carbonate, has a magnesium content which can be controlled below 1%, meeting the standard HG/T2226-2010; a second one of products, high-purity light magnesium oxide has a purity of more than 98%, meeting the standard HG/T2573-2012. The indirect calcination of dolomite avoids the direct contact between dolomite and coal gas, natural gas or combustion supporting gas, thereby eradicating the introduction of external impurities from the origin; the use of the high-purity carbon dioxide generated by the dolomite calciner in the primary calcination device 1 for the carbonization section, not only realizes the recycling of resources but also guarantees the purity of carbon dioxide gas used in the carbonization section, avoiding the introduction of impurities in the carbonization section.

2. The carbonization reaction tank can improve the mixing degree of carbon dioxide gas and digestion emulsion and promote the carbonization reaction, by digestion emulsion flowing at a high speed driving the inflow of carbon dioxide gas and cutting the carbon dioxide gas into microbubbles; the convection mixing of the gas-liquid mixture of carbon dioxide gas and digestion emulsion can promote the further combination of carbon dioxide and digestion emulsion; the introduction of the inhibitor into the carbonization reaction of the carbonization reaction section can prevent the generated calcium carbonate from being converted into calcium bicarbonate, thus avoiding the dissolution of calcium.

3. The negative pressure adjustment being performed in the pyrolysis section can ensure that the boiling point temperature in the pyrolysis kettle is between the pyrolysis temperature of calcium bicarbonate and that of magnesium bicarbonate, thus avoiding the pyrolysis of calcium bicarbonate and ensuring the purity of magnesium carbonate; the introduction of the dispersant into the pyrolysis section can promote the formation of magnesium carbonate.

4. By controlling dolomite not to be in direct contact with the outside during calcination and providing an independent exhaust system, it is ensured that gas in the flue gas only comes from the decomposition of dolomite; the invention can improve the purity of carbon dioxide in flue gas, so that the purity of carbon dioxide in flue gas is about 85%.

5. The gas recovery is started when the dolomite is heated to 650-750° C. by controlling the time node of gas recovery, so that the starting time of the carbon dioxide capture device 6 is consistent with the initial decomposition time of magnesium carbonate, which can not only reduce energy consumption but also can provide a buffer time for the preheating and drying of dolomite, avoiding a large amount of water vapor being mixed into the flue gas; moreover, some of heat in the subsequent calcination area will be transferred to the dolomite to be calcined through material accumulation and gas flow, and therefore, less water vapor is generated in the subsequent dolomite calcination process, so that there will be not a large amount of water vapor mixed into the flue gas in the subsequent calcination process.

6. The invention can improve resource utilization and reduce energy consumption. In the calcination process, heat is mainly concentrated in the calcination areas of the furnace, and a small amount of dissipated heat can only be transferred upward to the dolomite to be calcined through material accumulation and gas flow, or be transferred downward to cooling water in the circulating cooling assemblies; the heated cooling water can be used as the heat source in the pyrolysis section. In addition, the use of the decomposition mother liquor generated in the pyrolysis section for digestion in the digestion section, can realize not only the recycling of inhibitor but also the reuse of heat, that is, heat is transferred from the dolomite calcination areas to cooling water, then from the heated cooling water to the pyrolysis section, and finally from decomposition mother liquor in the pyrolysis section to the digestion section.

BRIEF DESCRIPTION OF DRAWINGS

To more clearly explain implementation modes of the invention or technical solutions in the prior art, the accompanying drawings needed using in the description of the implementation modes or the prior art will be briefly introduced below. It is obvious that the accompanying drawings in the following description are just some implementation modes of the invention and those skilled in the art can obtain other accompanying drawings according to the structures shown in these accompanying drawings without any creative labor done.

FIG. 1 is a schematic module diagram of a complete set of treatment system in one embodiment of the invention.

Figure 2:
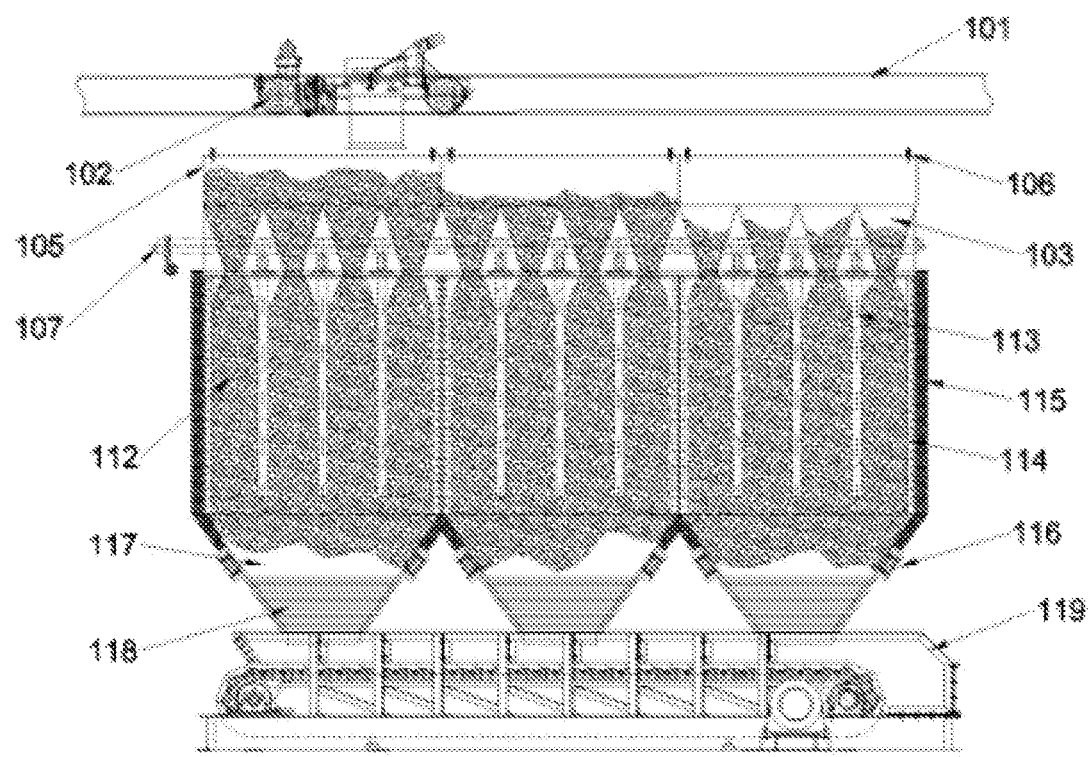
FIG. 2 is a schematic elevation diagram of a dolomite calciner in one embodiment of the invention.

DESCRIPTION OF REFERENCE NUMERALS primary calcination device 1; digestion device 2; carbonization separation device 3; pyrolysis device 4; secondary calcination device 5; carbon dioxide capture device 6; first gas outlet 7; second gas outlet 8; recovery system 9; first recovery pipeline 10; second recovery pipeline 11; circulating water return pipeline 12; decomposition mother liquor return pipeline 13 adhesive belt conveyor 101; mobile unloading truck 102; blanking bin 103; blanking hopper 104; baffle 105; position controller 106; exhaust pipe 107; exhaust chamber 108; hoarding 109; top plate 110; feed inlet 111; calcination area 112; heating rod 113; heating plate 114; thermal insulation layer 115; vibrator 116; material discharge bin 117; circulating water cooling assembly 118; plate conveyor 119 carbonization reaction tank 201; feeding port 202; gas circuit circulation outlet 203; water circuit circulation outlet 204; drain port 205; temperature display interface 206; pressure display interface 207; liquid level display interface 208; access port 209; gas-liquid mixing reactor 210; feed tube 211; gas jet tube 212; relief valve 213; gas circuit circulation check valve 214; gas-liquid mixing tube 215; convection mixing jet tube 216; forward flow mixer 217; reverse flow mixer 218; circulating pump 219; circulating pump inlet valve 220; circulating pump outlet valve 221.

The realization of purposes, functional features and advantages of the invention will be further described in combination with the implementation modes by referring to the accompanying drawings.

DETAILED DESCRIPTION OF THE EMBODIMENTS

The technical solutions in the implementation modes of the invention will be clearly and completely described in combination with the accompanying drawings in the implementation modes of the invention. Obviously, the described implementation modes are only a part of the implementation modes of the invention, but not all of them. All other embodiments obtained by those skilled in the art based on the implementation modes in the invention without creative work done, fall within the protection scope of the invention.

It should be explained that in the implementation modes of the invention, all directional indications (such as up, down, etc.) are only used to explain the relative position relationship, motion and the like between components in a specific attitude (as shown in the accompanying drawings). If the specific attitude changes, the directional indications will change accordingly.

In addition, the description of "first", "second" and the like in the invention is only for the purpose of description, and cannot be understood as indicating or implying its relative importance or indicating implicitly the number of indicated technical features. Therefore, the features defined with "first" and "second" can explicitly or implicitly include at least one such feature.

Moreover, the technical solutions in various implementation modes of the invention can be combined with each other, on the premise that these combinations can be realized by those skilled in the art. When a combination of technical solutions is contradictory or impossible to realize, it should be considered that such a combination of technical solutions neither exists nor is within the protection scope claimed by the invention. As used herein, the term 'hoardings' means a structural plate of a flue surrounded by lower cone of a conical feed bin. As used herein, the 'Calcined powder' and 'Calcined white' are same substance. The 'Calcined powder' or 'Calcined white' is calcined dolomite.

Figure 3:
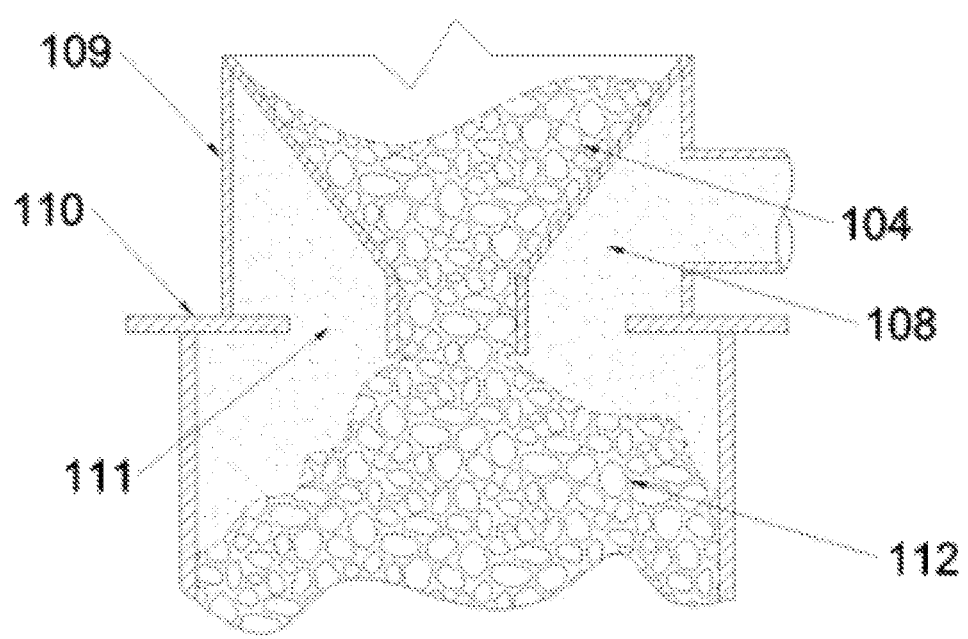
FIG. 3 is a schematic structure diagram of an exhaust chamber in one embodiment of the invention.
Figure 4:
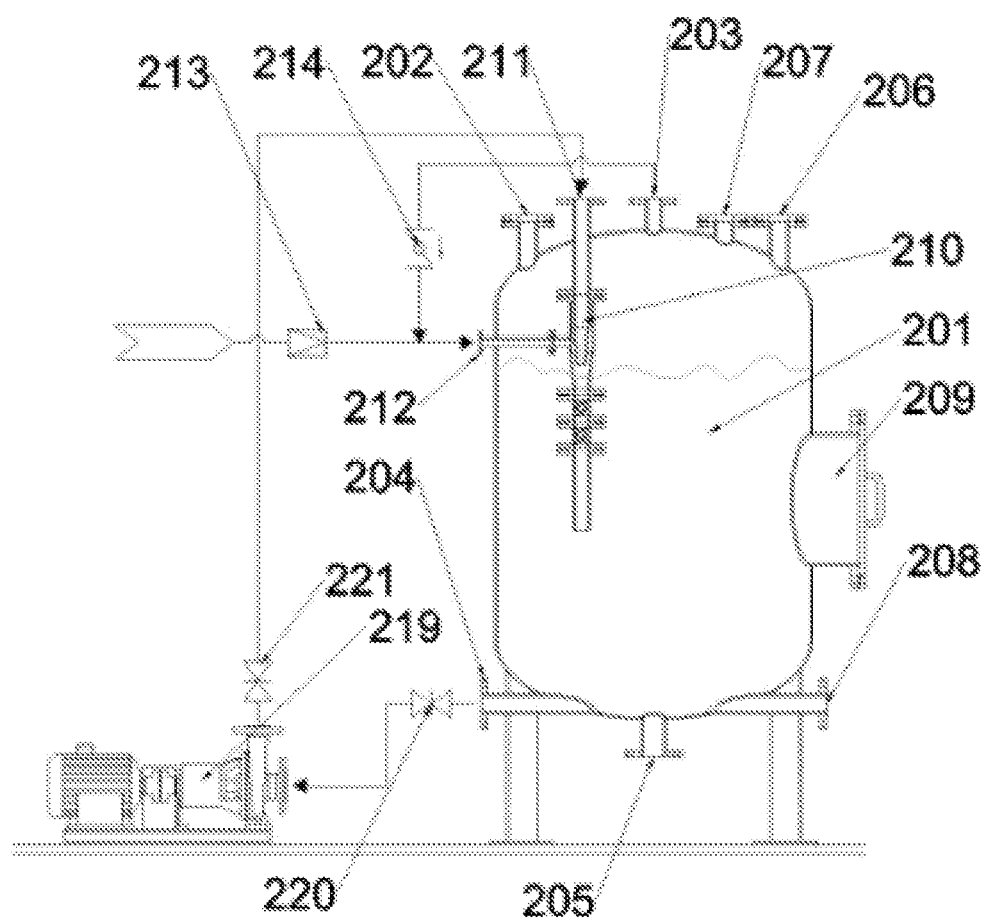
FIG. 4 is a schematic structure diagram of a carbonization reaction device in one embodiment of the invention.
Figure 5:
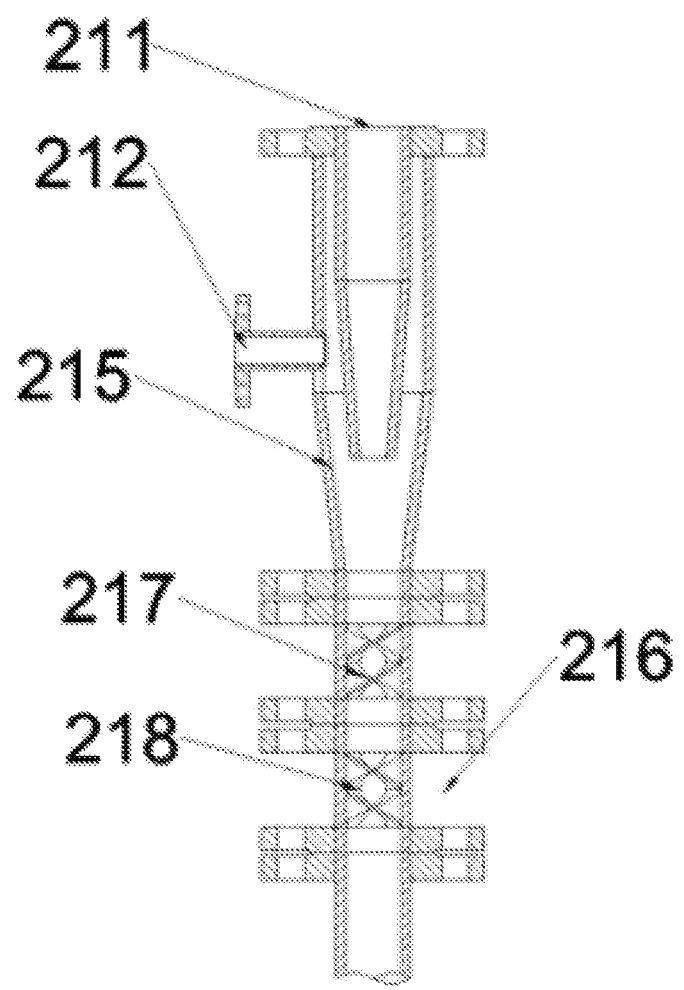
FIG. 5 is a schematic structure diagram of a gas-liquid mixing reactor in one embodiment of the invention.

As shown in FIGS. 1 to 5, the invention provides a complete set of treatment system for deep utilization of dolomite resources, including a primary calcination device 1, a carbon dioxide capture device 6, a digestion device 2, a carbonization separation device 3, a pyrolysis device 4, and a secondary calcination device 5.

Specifically, the primary calcination device 1 includes a dolomite calciner performing the indirect calcination treatment of dolomite, a plurality of hoardings 109 and an exhaust pipe 107. An exhaust chamber 108 is formed in a surrounding way between the hoardings 109, the top of the dolomite calciner and the outer wall of a blanking bin 103; and the feed port of the dolomite calciner, the blanking port of the blanking bin, and the exhaust port of the dolomite calciner all are in communication with the exhaust chamber 108. The exhaust chamber 108 is in communication with the gas inlet of the carbon dioxide capture device 6 through the exhaust pipe 107. Further, the feed port of the dolomite calciner and the exhaust port of the dolomite calciner can be the same opening, collectively referred to as feed inlet 111.

Wherein the applicant needs to explain that the "indirect treatment", "indirect heating treatment" and "indirect calcination treatment" in the application all differ from the existing direct calcination of dolomite, such as the direct sintering, calcination and heating of dolomite by ignition without coke and pulverized coal added, or the direct calcination in an open fire by introducing fuel gas; and the "indirect treatment", "indirect heating treatment" and "indirect calcination treatment" in the application refer to a mode for calcining materials by conducting heat to material flow through the electric heating of materials in a furnace or furnace walls, or the heating of the furnace walls. In an optional embodiment, the dolomite calciner performing the indirect calcination treatment of dolomite can indirectly calcine the dolomite with electricity or fuel gas as calcination energy source to obtain calcined white and carbon dioxide gas; and the non-calcined dolomite is preheated and dried through the accumulation of dolomite and the flow of carbon dioxide gas in the dolomite calciner.

The primary calcination device 1 will be exemplified below with a specific example. The dolomite calciner performing the indirect calcination treatment of dolomite is a shaft furnace or shaft kiln, and includes the blanking bin 103, a furnace body and material discharge bins 117 sequentially provided from top to bottom.

Wherein the furnace body can include a furnace, and the furnace is provided at its top with a top plate 110 which is used for closing its furnace mouth and has at least one feed inlet 111.

In a specific example, the furnace is covered with a thermal insulation layer 115 on its Outerwall, and is formed in its interior with at least one calcination area 112 surrounded by heating plates 114; and at least one heating rod 113 extending into the calcination area 112 is fixed on the top plate 110. Generally, a plurality of heating rods 113 are uniformly arranged in each calcination area 112 to uniformly calcine dolomite in the calcination area 112.

It should be noted that the distances between the adjacent heating rods 113 and those between the heating rods 113 and the heating plates 114 can be determined according to actual situations, and can be specifically set between 100 mm and 500 mm, as a preferred alternative.

The blanking bin 103 is provided above the top plate 110, at least one blanking port of the blanking bin 103 is in communication with the calcination area 112 through the feed inlet 111, and the blanking port has a smaller size than the feed inlet 111.

The closed exhaust chamber 108 is formed in a surrounding way between the hoardings 109, the outer wall of the blanking bin 103 and the top plate 110, and the exhaust chamber 108 is in communication with the calcination area 112 through the feed inlet 111. Wherein the blanking port can be flush with the feed inlet 111, or can slightly extend into the calcination area 112 to avoid the feed inlet 111 being completely blocked by dolomite.

The material discharge bins 117 are provided below the furnace, so that dolomite materials in the calcination area 112 pass through the material discharge bins 117 and then are discharged to a conveying mechanism.

The exhaust pipe 107 is configured to be simultaneously in communication with the exhaust chamber 108 and the carbon dioxide capture device 6, so as to discharge gas generated in the calcination area 112 into the carbon dioxide capture device 6 sequentially through the feed inlet 111, the exhaust chamber 108 and the exhaust pipe 107.

In the application, since the hoardings 109 around the exhaust chamber 108 surround the outer wall of the blanking bin 103, during the gas recovery process, a part of heat will be transferred to the blanking bin 103 to preheat and dry dolomite, so that the water vapor content in carbon dioxide will be very low during the subsequent calcination and decomposition of dolomite. Moreover, it is particularly novel that since there is an accumulation relationship between dolomite in the blanking bin 103 and dolomite in the calcination area 112, the accumulated materials in the blanking bin 103 separate the outside from the interior of the dolomite calciner, and additionally, a part of heat will be also transferred to the blanking bin 103 along with the dolomite accumulation to further preheat the materials in the blanking bin 103.

In a specific implementation mode, the hoardings 109 can be fixedly connected to the outer wall of the blanking bin 103 and the top plate 110 by welding and flange connection to close the gap between the outer wall of the blanking bin 103 and the top plate 110. The hoardings 109 and the blanking bin 103 can also be provided integrally, so that the bottoms of the hoardings 109 can be held against the top of the furnace body by adjusting the height of the blanking bin 103.

Specifically, when magnesium carbonate in dolomite (generally when dolomite is heated to about 700 degrees) starts to decompose, an induced draft fan in the carbon dioxide capture device 6 is turned on to convey gas generated in the calcination area 112 to the carbon dioxide capture device 6. For example, since there is water contained in dolomite, when magnesium carbonate starts to decompose, the material temperature is about 700° C., and water in dolomite is basically evaporated at this time, so that there will be less water in the recovered carbon dioxide. Subsequently, due to the presence of the preheating in the blanking bin 103, there will be also less water in the carbon dioxide generated subsequently.

A valve can also be provided at the communication between the exhaust pipe 107 and the exhaust chamber 108 to prevent water generated in an earlier stage from entering the exhaust pipe 107. The valve can be communication linked with a controller located outside.

Further, in order to accurately control the position of the blanking bin 103, on the blanking bin 103 or a feed mechanism can be installed position controllers 106 which can be an acoustic-wave position controller 106 or a tuning-fork position controller 106, and the feed mechanism can be an adhesive belt conveyor 101 with a mobile unloading truck 102. The position controllers 106 monitor the position of the blanking bin 103 and control the mobile unloading truck 102 on the conveyor feeding materials to the blanking bin 103, so as to realize the interlocking control of the blanking bin 103 and the adhesive belt conveyor 101.

Wherein the blanking bin 103 can include multiple blanking hoppers 104 provided with the blanking port, and the blanking hoppers 104 are funnel-shaped. Specifically, the blanking bin 103 can entirely consist of multiple blanking hoppers 104; or the lower part of the blanking bin 103 can consist of multiple blanking hoppers 104, and the upper part of the blanking bin 103 is formed by being surrounded by baffles 105. Moreover, each blanking hopper 104 is provided with one blanking port, and sealing connection is required between the side wall top ends of two adjacent blanking hoppers 104 and between the blanking hopper 104 and the hoardings 109 to ensure the sealing of the exhaust chamber 108. For accurate feed, the position controllers 106 can also be installed on the blanking hoppers 104 or the baffles 105 to realize the control over the bin position in each blanking hopper 104. Of course, this purpose can also be realized by providing the position controllers 106 on the mobile unloading truck 102.

In addition, for the feed to the furnace body and its material discharge to be smoother, vibrators 116 are provided on the outer walls of the material discharge bins 117 to discharge dolomite materials more uniformly and stably. For the convenience for cooling down the high-temperature calcined white generated in the calcination area 112 to ensure that the conveying mechanism which conveys materials outwards will not be burnt out due to excessive high temperature, circulating water cooling assemblies 118 are provided on the outer walls of the material discharge bins 117 to cool down the calcined white generated after calcination. The conveying mechanism can be a plate conveyor 119. Further, the circulating water cooling assemblies 118 can be provided at the middle and lower parts of the material discharge bins 117, and can be water-cooled sandwich walls. Water-cooled chambers can be formed in a surrounding way between the water-cooled sandwich walls and the outer walls of the discharge bins 117 for cooling water to enter and be discharged after heating up. The hot water outlets of the circulating water cooling assemblies are in communication with the water bath hot water inlet of a pyrolysis kettle through a circulating water return pipeline 12, and the heated hot water in the water-cooled chambers is used for supplying heat to the pyrolysis kettle.

It should be pinpointed that the primary calcination device 1 mainly calcine dolomite and recovers gas, and adopts the dolomite calciner to replace a traditional kiln; the dolomite calcination by the calciner does not need to add combustion auxiliary materials such as pulverized coal, coke or heavy oil, and uses clean electric energy or fuel gas for indirect treatment, which solves the light-burned dolomite pollution of substances such as fly ash, tar and the like at the front end; therefore, the light-burned dolomite produced by the calciner has high purity, good activity, and no pollution, which can effectively reduce the impurity removal cost of subsequent treatment sections and improve the production efficiency. The calciner further has the feature of not needing to blow in a large amount of combustion supporting air during the calcination process, and therefore, the $CO_2$ gas obtained by the calcination and decomposition is of high purity and does not contain $SO_2$, CO, $H_2S$, etc. The furnace gas composition is about 85% $CO_2$, 11.85% $N_2$ and 3.15% $O_2$, which can be directly dusted and then enter an intermediate gas bag through secondary compression to be temporarily stored to be used in the carbonization section, without waste gas and carbon dioxide discharged.

Moreover, the dolomite calciner can adopt indirect electric heating or adopt a fuel gas burner to supply hot gas for indirect heating; and during production, dolomite ore is crushed into 5 to 10 cm and put into an inner furnace. When the indirect electric heating is adopted, the heating rods 113 and the heating plates 114 use electric power as energy source to heat the calcination areas 112. When fuel gas heating is adopted, the heat source performs heating at the outer wall of the furnace; due to the structural designs of the blanking bins, the baffles and the top plate, and the arrangement of the exhaust chamber, the materials in the calcination areas can be prevented from being in contact with the heat source and the combustion supporting air under the condition of the dolomite accumulation, thus ensuring the cleanliness of the materials, and in addition, ensuring the realization of functions such as dolomite feeding, closed gas discharge and heat exchange. The heat in the calcination areas 112 is transferred to dolomite in the blanking bins 103 through the dolomite accumulation and the flow of gas to preheat and dry dolomite. In addition, when fuel gas is adopted for heating the outer wall, after rising, the heated gas outside the indirectly heated inner furnace can also be used for preheating the materials, without needing to worry about its affecting calcined white products and carbon dioxide.

It should also be understood that the dolomite calciner not only realizes the heat exchange between gas and materials and between materials on the premise of ensuring the close gas recovery, but also has a further energy-saving effect. For example, since the thermal insulation layer 115 is provided on the outer wall of the furnace, the heat inside the furnace can only be transferred upward or downward, and since there is heat exchange between gas and materials and between materials above the furnace, the upward-transferred heat will be fully utilized by dolomite in the blanking bins 103. In addition, since the circulating water-cooling assemblies 118 are provided on the outer walls of the material discharge bins 117, a small part of downward-transferred heat will be absorbed by cooling water in the circulating water cooling assemblies 118, and after heating up, the cooling water can be used in other processes for dolomite to improve the heat utilization rate.

The carbon dioxide capture device 6 includes a compression temporary storage gas tank assembly, a carbon dioxide circulation subsystem and a recovery system 9. The gas inlet of the compression temporary storage gas tank assembly is in communication with the exhaust chamber through the exhaust pipe. The compression temporary storage gas tank assembly includes a first gas outlet 7 and a second gas outlet 8 which is in communication with the recovery system 9. The carbon dioxide circulation subsystem includes a gas transmission pipeline, a first recovery pipeline 10 and a second recovery pipeline 11.

Wherein the compression temporary storage gas tank assembly can discharge a part of carbon dioxide into the carbonization separation device 3 through the first gas outlet 7 to complete the carbonization reaction. The other surplus part of carbon dioxide can be discharged into the recovery system 9 through the second gas outlet 8 to be stored. Since there is always the decomposition into carbon dioxide during the dolomite processing, and carbon dioxide can be recycled, surplus carbon dioxide can be stored in the recovery system 9.

The digestion device 2 can digest the calcined white by adding aqueous solution through a rotary digester to obtain digestion emulsion; the digestion emulsion is cooled by a rotary cooler to obtain the cooled digestion emulsion.

Wherein the aqueous solution in the digestion section includes water or decomposition mother liquor obtained after the reaction in pyrolysis device 4. Inhibitor can be added to the digestion emulsion obtained after water digestion to ensure the separation of calcium from magnesium. The inhibitor includes one or more of ethylene diamine tetraacetic acid, sodium hexametaphosphate, polyacrylic acid, hydrolyzed polymaleic anhydride and nitrilotriacetic acid, and the addition amount of the inhibitor can be 0.01% to 0.05% of the digestion emulsion by mass fraction. In addition, the solid-liquid ratio of the calcined white to the water or the decomposition mother liquor is 1 kg: 10-30 L; the first batch of calcined white is digested with 50-80° C. water, and other batches of calcined white are digested with the uncooled decomposition mother liquor.

It should be pinpointed that in the rotary digester of the invention, the digestion emulsion is digested by the decomposition mother liquor obtained after solid-liquid separation in a pyrolysis section, plus the heat released by calcined white during the digestion process, which makes it unnecessary to consider the heating of digestion water in continuous production. In addition, the rotary cooler in a high and low step arrangement is provided behind the rotary digester, the digestion emulsion overflows into the rotary cooler for the completion of cooling, and then is cooled to about 30° C. and enters a carbonization reactor in the carbonization section through a pump. After sand washing, digestion filter residue meets the GB/T14684-2011 Standard for sand for construction, and can be sold as construction materials, without waste residue generation or discharge. All washing water returns to the digester to be recycled, without waste water discharged. The rotary digester and the rotary cooler are adopted to replace a traditional stirring digestion tank and a cooling tank, which can well avoid the problems of affecting normal production, such as the serious calcium precipitation of digestion slurry, the blockage of equipment and pipelines, etc.

The carbonization separation device 3 includes a carbonization reaction tank 201 whose gas inlet is in communication with the first gas outlet 7 of the compression temporary storage gas tank assembly.

Specifically, the carbonization separation device 3 in an embodiment of the invention is exemplified with examples below. To ensure the full reaction between digestion emulsion and carbon dioxide gas, the carbonization reaction device can be a water-ring type carbonization reactor, and specifically includes the carbonization reaction tank 201, a gas-liquid mixing reactor 210 and a circulating pump 219; of course, the carbonization reaction device can further include a plurality of pipelines for conveying digestion emulsion or carbon dioxide and functioning as communication.

The carbonization reaction tank 201 is provided with a feeding port 202 and a gas circuit circulation outlet 203 at its top, and is provided with a water circuit circulation outlet 204 and a drain port 205 at its bottom, and a drain valve is installed at the drain port 205. In addition, a temperature display interface 206, a pressure display interface 207, a liquid level display interface 208, and an access port 209 are also provided on the carbonization reaction tank 201, so that the staff can monitor the carbonization reaction and maintain the carbonization reaction tank 201.

The gas-liquid mixing reactor 210 includes a gas-liquid mixing tube 215, a feed tube 211 and a gas jet tube 212; wherein the gas-liquid mixing tube 215 is installed inside the carbonization reaction tank 201, and specifically can be installed in the upper part of the carbonization reaction tank 201, so that sufficient accommodating space is reserved in the carbonization reaction tank 201 to facilitate the full carbonization reaction. The gas-liquid mixing tube 215 is provided with a seal at its top, and is provided with an installation port for the gas jet tube 212 in its side wall upper part, and the lower end of the gas-liquid mixing tube 215 is configured to be in communication with the interior of the carbonization reaction tank 201.

To mix digestion emulsion with the carbon dioxide composition, the feed tube 211 sequentially passes through the top of the carbonization reaction tank 201 and the seal from top to bottom, and then extends into the interior of the gas-liquid mixing tube 215, and the material outlet of the feed tube 211 is located below the installation port for the gas jet tube 212. The gas inlet of the gas jet tube 212 is simultaneously in communication with a gas supply device (i.e. the first gas outlet 7) and the gas circuit circulation outlet 203, and the exhaust port of the gas jet tube 212 is installed at the installation port for the gas jet tube 212 and is configured to be in communication with the gas-liquid mixing tube 215, so that carbon dioxide enters the gas-liquid mixing tube 215 under being driven by the digestion emulsion flowing at a high-speed, and is cut into microbubbles by the digestion emulsion.

To further convection mix the gas-liquid mixture of digestion emulsion and carbon dioxide, the gas-liquid mixing reactor 210 further includes a convection mixing jet tube 216 which is configured to be respectively in communication with the lower end of the gas-liquid mixing tube 215 and the carbonization reaction tank 201. The convection mixing jet tube 216 is provided below the gas-liquid mixing tube 215, and is provided with a forward flow mixer 217 and a reverse flow mixer 218 sequentially from top to bottom.

The convection mixing jet tube 216 and the gas-liquid mixing tube 215 can be integrally provided or fixedly connected. The gas-liquid mixture obtained in the gas-liquid mixing tube 215 enters the convection mixing tube from the lower opening of the gas-liquid mixing tube 215, and is sprayed into the carbonization reaction tank 201 through the convection mixing of the forward flow mixer 217 and the reverse flow mixer 218.

As an explanation of the forward flow mixer 217 and the reverse flow mixer 218: the forward flow mixer 217 is mainly used to rotate the downwardly-flowing gas-liquid mixture in a forward direction, and the reverse flow mixer 218 is mainly used to rotate the downwardly-flowing gas-liquid mixture in a reverse direction. The forward rotation and the reverse rotation are relative concepts, and it is only necessary for the rotation direction between them to be opposite. Generally, the forward rotation can be understood as a clockwise rotation, and the reverse rotation can be understood as a counterclockwise rotation.

Specifically, the forward flow mixer 217 includes a first tube body and a first spiral bump projecting on the tube cavity inner wall of the first tube body; the reverse flow mixer 218 includes a second tube body and a second spiral bump projecting on the tube cavity inner wall of the second tube body; the first spiral bump and the second spiral bump have opposite spiraling directions. The first tube body and the second tube body can be integrally provided, and can also be fixedly connected through a fixing piece. As an alternative, the spiraling direction of the first spiral bump can be clockwise, and the spiraling direction of the second spiral bump can be counterclockwise; both the first spiral bump and the second spiral bump can be a double spiral structure, and of course, can also be a single spiral structure. In addition, it should be pinpointed that the forward flow mixer 217 and the reverse flow mixer 218 can form a high-speed gas-liquid convection for the mixing reaction to be fuller and for the reaction to be more efficient.

As the structure design of the gas-liquid mixing reactor 210, for digestion emulsion and gas-liquid mixture of the digestion emulsion and carbon dioxide to have a higher jet speed, the tube cavity inner diameter at the lower part of the feed tube 211 gradually decreases, and the tube cavity inner diameter at the lower part of the gas-liquid mixing tube 215 can also be configured to gradually decrease. On this basis, the material outlet of the feed tube 211 can extend to the lower part of the gas-liquid mixing tube 215, and there is a gap required between the feed tube 211 and the inner wall of the gas-liquid mixing tube 215 for carbon dioxide gas to flow.

To facilitate the gas supply to the gas-liquid mixing tube 215 and the recycling of the unreacted carbon dioxide, a relief valve 213 is provided between the gas inlet of the gas jet tube 212 and the gas supply device to regulate the gas pressure of the carbon dioxide supplied by the gas supply device, and a gas circuit circulation check valve 214 is provided between the gas inlet of the gas jet tube 212 and the gas circuit circulation outlet 203 to prevent forming a split-flow from the carbon dioxide supplied by the gas supply device from in the gas intake process. In addition, for the gas jet tube 212 to simultaneously receive the carbon dioxide supplied by the gas supply device and the carbon dioxide in circulation, the relief valve 213 and its corresponding pipelines can be configured to be in parallel with the gas circuit circulation check valve 214 and its corresponding pipelines.

It should be understood that the carbonization reaction tank 201 has a normal operation gas pressure of about 20-40 KPa; when the carbonization reaction tank 201 continuously operates with the hydraulic circulating pump 219 cooperatively, the digestion emulsion in the carbonization reaction tank 201 will continuously absorb $CO_2$ to reduce the pressure in the reactor; and therefore, a constant pressure valve is equipped to maintain the $CO_2$ supply and the required pressure during continuous operation. On this basis, the relief valve 213 can be used cooperatively with the constant pressure valve; the constant pressure valve can be provided on the feed tube 211, and can also be provided on the communication pipeline between the feed tube 211 and the relief valve 213.

To ensure the high-speed flow of digestion emulsion, the liquid inlet of the circulating pump 219 is in communication with the water circuit circulation outlet 204, and the liquid outlet of the circulating pump 219 is in communication with the feed port of the feed tube 211, so as to pump the digestion emulsion in the carbonization reaction tank 201 into the feed tube 211 at a high speed, so that the digestion emulsion entering the feed tube 211 enters the gas-liquid mixing tube 215 from top to bottom at a high flow rate, and cut carbon dioxide gas. Wherein a circulating pump inlet valve 220 is provided between the circulating pump 219 and the water circuit circulation outlet 204, and a circulating pump outlet valve 221 is provided between the circulating pump 219 and the feed port of the feed tube 211, to control the liquid in circulation.

It should be pinpointed that the above carbonization reaction device adopts the gas-liquid mixing reactor 210, and circulates liquid through the circulating pump 219 under fully closed and pressurized conditions, so that the two-phase gas-liquid not only makes carbon dioxide separated into microbubbles by digestion emulsion but also generates spiral convection, in the circulation process. In addition, a circulating gas circuit generated in the carbonization reaction device also enable the $CO_2$ gas that is not fully absorbed once to enter the gas-liquid mixing reactor 210 through the negative pressure generated by the circulating pump 219 to be gas-liquid mixed and carbonized again until it is completely absorbed. The carbonization reaction device in the invention not only is highly efficient but also does not cause the leakage and waste of the $CO_2$ reaction gas. In a high temperature production period in summer, it is difficult to control the carbonization temperature below 35° C. due to the influence of environment and mechanical heat during the carbonization process, so that a small amount of calcium bicarbonate will be dissolved in heavy magnesium water (magnesium bicarbonate solution), thereby affecting the product purity. Therefore, in the high temperature production period, 0.01-0.05% by mass fraction inhibitor will be added to digestion emulsion to effectively control the dissolution of calcium bicarbonate in the carbonization process.

The pyrolysis device includes the pyrolysis kettle and a vacuum pump. The vacuum pump is in communication with the pyrolysis kettle to maintain the negative pressure state in the pyrolysis kettle, so that the boiling point of the calcium-containing heavy magnesium aqueous solution in the pyrolysis kettle is between the pyrolysis temperature of magnesium bicarbonate and the pyrolysis temperature of calcium bicarbonate. Wherein the decomposition mother liquor after the pyrolysis reaction in the pyrolysis device 4 returns to the liquid inlet of the digestion device 2 through the decomposition mother liquor return pipeline 13. The first recovery pipeline 10 is in communication with the gas outlet of the pyrolysis kettle and the gas inlet of the carbon dioxide capture device 6.

Specifically, by the vacuum pump's extracting gas from the pyrolysis kettle, and controlling the boiling point of magnesium bicarbonate between the pyrolysis temperature of magnesium bicarbonate and the pyrolysis temperature of calcium bicarbonate, the pyrolysis device 4 pyrolyzes the magnesium bicarbonate solution in the pyrolysis kettle that is in the negative pressure state to obtain decomposition mother liquor, magnesium carbonate precipitation and carbon dioxide gas.

It should be explained that in the pyrolysis section, the formation of a negative pressure inside the vacuum pyrolysis kettle through the vacuum pump, can reduce the temperature required for the pyrolysis treatment and can also extract the carbon dioxide generated in the helical ribbon vacuum pyrolysis kettle. Since both calcium bicarbonate and magnesium bicarbonate have a pyrolysis temperature of lower than 100° C., and calcium bicarbonate has a higher pyrolysis temperature than magnesium bicarbonate, the boiling point of the solution can be controlled between the pyrolysis temperature of magnesium bicarbonate and the pyrolysis temperature of calcium bicarbonate by vacuumizing the vacuum pyrolysis kettle for its internal pressure to be close to vacuum, so as to avoid the doping caused by the simultaneous precipitation of calcium and magnesium.

Specifically, the pyrolysis kettle in the pyrolysis section will generate high concentration $CO_2$ gas with a certain amount of water vapor during operation. The gas is pumped out by a negative pressure water-ring vacuum pump equipped in the reaction kettle, and the negative pressure is generally controlled below 0.02 MPa. The water tank of the water-ring vacuum pump will be enriched with the moisture contained in the high-concentration $CO_2$ gas with a certain amount of water vapor; and after the separation of the gas-liquid separator, the $CO_2$-rich gas will enter the carbon dioxide capture device 6 to be used for the carbonization reaction in the carbonization section or the collection of carbon dioxide.

To increase the decomposition speed of magnesium bicarbonate, dispersant is added to magnesium bicarbonate solution before the pyrolysis of magnesium bicarbonate solution by using the pyrolysis kettle to promote the formation of magnesium carbonate in the pyrolysis process; wherein the dispersant includes one or more of methanol, alcohol, glycerin, polyacrylamide, cellulose derivatives and water glass. The addition amount of the dispersant can be 0.1%~2% by volume of the magnesium bicarbonate solution.

In addition, the pyrolysis kettle can be a helical ribbon pyrolysis kettle which can be provided with a helical ribbon agitator preventing material deposition and wall attachment, so as to avoid reducing the effect of heat supply to the pyrolysis kettle due to material deposition and wall attachment.

It should be pinpointed that the above embodiment adopts the vacuum pyrolysis kettle with the helical ribbon agitator for pyrolysis, the pyrolysis kettle is provided with a heating jacket on its outer wall, and the heating heat source in the jacket comes from the circulating cooling water in the circulating water cooling assemblies 118 in the primary calcination section; the helical ribbon agitator provided in the pyrolysis kettle is used to prevent the increase in energy consumption resulting from the decrease in heat conductivity due to material deposition and wall attachment, and can accelerate the decomposition reaction of heavy magnesium water. The pyrolysis kettle is also equipped with a water-ring vacuum pump; the water-ring vacuum pump provides negative pressure to form a vacuum inside the kettle during operation for reducing the decomposition temperature of heavy magnesium water in the pyrolysis kettle, which, plus the addition of dispersant, greatly increases the decomposition speed of magnesium bicarbonate while making magnesium carbonate crystal finer, regular in shape, and higher in purity. The water tank of the water-ring vacuum pump is enriched with the moisture contained in a large amount of high concentration $CO_2$ gas generated by pyrolysis; the separated $CO_2$-rich gas enters the carbon dioxide capture device 6 in the calcination section through the gas-liquid separator, and then is reused together.

The complete set of treatment system for deep utilization of dolomite resources in the invention can further include a filter-pressing and drying section device, which sequentially filters, washes and dries the calcium carbonate precipitation and the magnesium carbonate precipitation respectively to obtain light calcium carbonate and light magnesium carbonate.

Specifically, in the filter-pressing and drying section device, a full-automatic vertical filter press/belt filter press integrating functions such as filtering, filter cake washing, extrusion, air drying, automatic unloading, automatic cleaning of filter cloth and the like, can be used to replace a traditional plate-and-frame filter press. Light calcium carbonate generated in the carbonization section and light magnesium carbonate generated in the pyrolysis section can be respectively filter-pressed by separate units in separate regions. After they both are filter-pressed, their filter cakes are respectively conveyed to astrogating flash dryer with separate units and regions; the fast rotating flash dryer has its own dispersing function, continuous and stable material feeding without bridging, and good air tightness; it can dry light calcium carbonate to a final water content of less than 0.1%, and can dry light magnesium carbonate to a final water content of less than 20%. The light calcium carbonate obtained can be packaged for sale, and the light magnesium carbonate enters the secondary calcination section for the preparation of light magnesium oxide.

The full-automatic vertical filter press used in the above embodiment has the function of automatically cleaning filter belts and filter cakes, which makes the filter-pressing more thorough while improving the product recovery rate by cleaning the filter cakes. The filter-pressed materials, light magnesium carbonate and light calcium carbonate, are both crystalline substances with high water absorption, and the traditional plate-and-frame filter press has a maximum filter pressure of 0.18 MPa, which makes it difficult to filter out too much water, thereby affecting the subsequent drying production. The vertical filter press has the function of automatic pressure maintaining and its maximum filter pressure can reach 1.6 MPa, which, plus its configured automatic air drying system, can realize the further drying of products.

The secondary calcination device 5 indirectly calcines the light magnesium carbonate to decompose it into light magnesium oxide and carbon dioxide gas. The secondary calcination device 5 includes a secondary calciner whose flue gas outlet is in communication with the gas inlet of the carbon dioxide capture device 6 through the second recovery pipeline 11.

It should be pinpointed that the light magnesium carbonate cannot be calcined by the dolomite calciner because of its low density and light weight, and therefore the secondary calcination section can perform the calcination by using an indirect heating rotary calciner, that is, an indirect calcination rotary calciner. The rotary calciner adopts closed spiral material feeding, the calcination material light magnesium carbonate is placed in the inner furnace, and then the outer wall of the inner furnace is heated by fuel gas flame. During this process, neither fuel gas nor its hot gas is in contact with the material, ensuring the cleanliness of the calcination material.

In the secondary calcination process, light magnesium carbonate is decomposed into high-purity light magnesium oxide and $CO_2$. When a certain amount of $CO_2$ is reached through decomposition, $CO_2$ naturally overflows from an exhaust channel at the top of the feed end and enters a settling chamber. A small amount of material dust settled in the settling chamber is the light magnesium carbonate and the light magnesium oxide which are not fully decomposed. The material dust can return to the feed device of the rotary calciner after being discharged by a star type discharge valve and being collected. A cloth bag-type dust collector for filtering dust in gas is provided behind the settling chamber, so that after being filtered to remove a small amount of dust, the $CO_2$ gas can be incorporated into the carbon dioxide capture device 6 in the calcination section, thereby realizing the recycling of carbon dioxide and ensuring no carbon dioxide and waste gas emission. In addition, the indirect heating rotary calciner discharges materials by using a closed screw conveyor with cooling function, and a micro negative pressure suction filtration is performed at the discharge blanking port, so that a part of light magnesium oxide dust can be recovered through a cyclone and a cloth bag.

For the invention, it should also be pinpointed that the carbon dioxide gas in the carbonization section includes the carbon dioxide gas obtained by calcining dolomite in the primary calcination section, the carbon dioxide gas obtained by the pyrolysis of the magnesium bicarbonate solution in the pyrolysis section, and the carbon dioxide gas obtained by calcining the light magnesium carbonate in the secondary calcination section, to ensure the full utilization of carbon dioxide and avoid waste emission. In addition, the pressurized carbonization pressure in the carbonization section comes from the $CO_2$ furnace gas compression gas bag of the carbon dioxide capture device 6. The $CO_2$ furnace gas stored in the $CO_2$ furnace gas compression gas bag has a pressure of 0.88 MPa. The $CO_2$ generated in the primary calcination section, the pyrolysis section, and the secondary calcination section all can firstly enter the $CO_2$ furnace gas compression gas bag of the carbon dioxide capture device 6, and then are used for the carbonization reaction in the carbonization section.

In the invention, the patent technology adopts a completely new or new complete set of equipment, has the advantages of high automation level, less one-time investment, stable operation, simple maintenance, no waste gas and carbon dioxide emission, etc. A first one of products, light calcium carbonate, has a purity of more than 98%, and its magnesium content can be controlled below 1%. A second one of products, high-purity light magnesium oxide, has a purity of more than 98%.

As a detailed description of the above embodiments, the above embodiments can also specifically include the following details:

After being crushed to 5-10 CM, dolomite enters the calcination areas 112 of the dolomite calciner through the feed mechanism. The hot gas in the calcination areas 112 rises and then enters the blanking bin 103 to preheat raw materials, so as to fully utilize waste heat. When dolomite ore in the calcination areas 112 heats up to about 700° C., the carbon dioxide capture device 6 is started, and the collected $CO_2$ furnace gas is pressurized to 0.8 MPa after purification and then enters the $CO_2$ furnace gas compression gas bag to be stored. The final calcination temperature is controlled within the material temperature of 1050° C. In the calcination process temperature is raised for about 30 min, and the temperature is maintained for about 1-2.5 h. Subsequently, by controlling the transportation speed of the plate conveyor 119 for discharging materials at the bottom of the indirect shaft calciner, materials in the calciner are controlled to stay for about 2.5 hours.

The calcined white obtained after calcination is continuously input into the rotary digester through the plate conveyor 119, and the rotary digester can fully digest it in a single pass of about 15 min. The digestion emulsion after digestion overflows into the rotary cooler arranged in steps, is cooled for about 30-45 min to about 30° C., and then is pumped into the carbonization reaction tank 201 through the pump. The digestion filter residue obtained from digestion can be sold as sand for construction after entering a sand washer through an elevator for sand washing, and all washing water will return to the rotary digester.

The digestion emulsion enters the carbonization reaction tank 201, and at the same time, the $CO_2$ gas in the $CO_2$ furnace gas compression gas bag (i.e. an intermediate gas bag) is depressurized to about 40 KPa through the relief valve 213, and then enters the gas jet tube 212 through the inlet of the configured constant pressure valve. Under the operation of the hydraulic circulating pump 219 configured in the carbonization reaction device, the carbonization reaction time of about 30 min can make the pH of the emulsion between 7.5 and 8.0. In the process, about 0.01-0.05% inhibitor is added according to actual production environment and control parameters. After the full reaction, the discharged materials enter the full-automatic belt filter press to be filter-pressed, and the filter cakes enter the rotating flash dryer through the conveyor for being dried to obtain light calcium carbonate which will be packaged for sale. The filtrate is heavy magnesium water which enters the pyrolysis kettle in the pyrolysis section through the pump; after being condensed, the dry water vapor can return to the rotary digester for being used.

Before the heavy magnesium water enters the pyrolysis kettle, the inner tank of the pyrolysis kettle has been heated to a certain temperature by the circulating water in the heating jacket coming from the circulating cooling assemblies in the calcination section. After the heavy magnesium water enters the pyrolysis kettle, the low-speed helical ribbon agitator in the pyrolysis kettle is started, and at the same time the supporting water-ring vacuum pump is started to vacuumize to below 0.02 MPa. At this time, the heavy magnesium water starts to decompose into magnesium carbonate, $CO_2$ and decomposition mother liquor; the $CO_2$ with a small amount of water vapor enters the gas-liquid separator through the water-ring vacuum pump for separation and then returns to the carbon dioxide capture device 6; and the decomposition mother liquor can be used for digestion in digestion section. 0.1-0.2% dispersant is added according to actual situations during production to crystallize magnesium carbonate faster and have its crystals finer and more regular in shape. Continuous operation of the pyrolysis kettle for about 10-30 min can basically complete the crystallization, and at this time, the obtained crystals will be discharged into the filter-pressing and drying section.

The filter-pressing and drying section is provided with two regions, the filter-pressing and drying of calcium carbonate and the filter-pressing and drying of magnesium carbonate are not performed by the same unit, and the filter-pressing and drying of calcium carbonate has been completed previously. Magnesium carbonate enters the full-automatic vertical filter press through the pump to be filter-pressed; the filter cakes enter the rotating flash dryer through the conveyor, are dried and then enter the secondary calcination section through the closed screw conveyor; the filtrate and dry water vapor all return to the digestion section after condensation.

Before the dried magnesium carbonate enters the rotary calciner, the rotary calciner is preheated to a certain temperature which is always maintained in the subsequent continuous material feeding and discharging to prevent magnesium carbonate from wall attachment, bridging, and the like. The magnesium carbonate is calcined for about 1-2 h at the temperature of 700-750° C. When heating up to 700° C., the decomposition into a large amount of $CO_2$ starts in the inner furnace and it naturally overflows into the settling chamber for sedimentation. A trace of settled dust returns to the feed system, and gas returns to the carbon dioxide capture device 6 after being filtered. The heated gas at the inner furnace outer wall of the rotary calciner can be output to the filter-pressing and drying section for drying calcium carbonate and magnesium carbonate, thereby fully utilizing waste heat. After the calcination of magnesium carbonate in the inner furnace of the rotary calciner is completed, high-quality light magnesium oxide is obtained, which is continuously discharged through the closed screw conveyor with the circulating water cooling function to be packaged for sale. After being heated, its circulating cooling water can be transmitted circularly to the pyrolysis section for pyrolysis use, so as to realize the full utilization of waste heat in the whole process.

As a further description of the carbon dioxide circulation subsystem: To form a circulation loop for the carbon dioxide generated and the carbon dioxide consumed in dolomite processing to realize the maximum utilization of resources, the carbon dioxide circulation subsystem includes the gas transmission pipeline, a carbon dioxide water vapor recovery pipeline, the gas-liquid separator, the first recovery pipeline 10 and the second recovery pipeline 11. Wherein the gas transmission pipeline is respectively in communication with the gas outlet of the carbon dioxide capture device 6 and the gas inlet of the carbonization reaction tank to transmit a part of the carbon dioxide in the carbon dioxide capture device 6 to the carbonization system; the carbon dioxide water vapor recovery pipeline is respectively communication with the flue gas outlet of the pyrolysis kettle and the gas inlet of the gas-liquid separator, the first recovery pipeline 10 is communication with the gas outlet of the gas-liquid separator and the gas inlet of the carbon dioxide capture device 6, to recover the carbon dioxide gas generated in the heavy magnesium water pyrolysis reactor and then transmit it to the carbon dioxide capture device 6 for recovery; the second recovery pipeline 11 is respectively in communication with the flue gas outlet of the secondary calcination device 5 and the gas inlet of the carbon dioxide capture device 6 to recover the carbon dioxide generated by the magnesium carbonate calciner to the carbon dioxide capture device 6 after being dusted.

The invention also provides a method for utilization of dolomite resources by adopting the complete set of treatment system and process for deep utilization of dolomite resources according to any one of the above embodiments.

The method for utilization of dolomite resources can also include the following step: when dolomite in the primary calcination device 1 is heated to 600-700° C., starting the carbon dioxide capture device 6 to recover and recycle carbon dioxide.

The method for utilization of dolomite resources can also include one or more of the following steps:
  adding inhibitor to the digestion device 2, wherein the inhibitor includes one or more of ethylene diamine tetraacetic acid, sodium hexametaphosphate, polyacrylic acid, hydrolyzed polymaleic anhydride and nitrilotriacetic acid;
  adding dispersant to the calcium-containing heavy magnesium aqueous solution, wherein the dispersant includes one or more of methanol, alcohol, glycerin, polyacrylamide, cellulose derivatives and water glass;
  wherein the solid-liquid ratio of the calcined white to the water or the decomposition mother liquor in the digestion device 2 is 1 kg: 10-30 L; and
  wherein the first batch of calcined white in the digestion device 2 is digested with 50-80° C. water, and other batches of calcined white are digested with the uncooled decomposition mother liquor.

In the above technical solutions of the invention, what is described above is only the preferred embodiments of the invention and does not limit the patent scope of the invention. Under the technical concepts of the invention, equivalent structure transformations made by using the contents of the specification and the accompanying drawings of the invention, or direct/indirect applications in other related technical fields, are all included in the patent protection scope of the invention.

What is claimed is:

1. A treatment system for deep utilization of dolomite resources, comprising a primary calcination device, a carbon dioxide capture device, a digestion device, a carbonization separation device, a pyrolysis device and a secondary calcination device;
  wherein the primary calcination device comprises a dolomite calciner performing the indirect calcination of dolomite, a plurality of hoardings and an exhaust pipe, and the dolomite calciner comprises a blanking bin, a furnace body and material discharge bins sequentially provided from top to bottom;
  the furnace body is covered with a thermal insulation layer on its outer wall; the blanking bin is provided above a feed port of the furnace body; a blanking port of the blanking bin is correspondingly provided through the feed port; the blanking port has a smaller size than the feed port; the feed port is used simultaneously as a exhaust port of the furnace body;
  an exhaust chamber is formed between the plurality of hoardings, the top of the furnace body and the outer wall of a blanking bin; the feed inlet of the dolomite calciner, the blanking port of the blanking bin and an exhaust port of the dolomite calciner are all in communication with the exhaust chamber which is in communication with the gas inlet of the carbon dioxide capture device through the exhaust pipe; the exhaust chamber is in communication with the interior of the furnace body through a feed port;
  wherein the blanking bin comprises a plurality of blanking hoppers, each of which is provided with one blanking port; sealing connection is formed between the side wall top ends of two adjacent blanking hoppers, and between the blanking hoppers and the plurality of hoardings;
  the material discharge bins are provided with circulating water cooling assemblies on their outer walls; a hot water outlets of the circulating water cooling assemblies are in communication with a water bath hot water inlet of a pyrolysis kettle through a circulating water return pipeline, and a heated circulating water is used for heat supply to the pyrolysis kettle;

the carbon dioxide capture device comprises a first gas outlet, a second gas outlet, a recovery system, a first recovery pipeline and a second recovery pipeline, and the second gas outlet is in communication with the recovery system;

the carbonization separation device comprises a carbonization reaction tank whose gas inlet is in communication with the carbon dioxide capture device through the first gas outlet;

the carbonization separation device further comprises a gas-liquid mixing reactor and a circulating pump;

the carbonization reaction tank is provided with a feeding port and a gas circuit circulation outlet at its top, and is provided with a water circuit circulation outlet and a drain port at its bottom; and a drain valve is installed at the drain port;

the gas-liquid mixing reactor comprises a gas-liquid mixing tube, a feed tube and a gas jet tube; wherein the gas-liquid mixing tube is installed inside the carbonization reaction tank, and is provided with a gas jet tube installation port in its side wall upper part; and the lower end of the gas-liquid mixing tube is configured to be in communication with the interior of the carbonization reaction tank;

the feed tube sequentially passes through the top of the carbonization reaction tank and a seal from top to bottom, and then extends into the interior of the gas-liquid mixing tube; and the material outlet of the feed tube is located below the gas jet tube installation port;

the gas inlet of the gas jet tube is simultaneously in communication with the first gas outlet and the gas circuit circulation outlet, and the exhaust port of the gas jet tube is installed at the gas jet tube installation port;

the liquid inlet of the circulating pump is in communication with the water circuit circulation outlet, and the liquid outlet of the circulating pump is in communication with the feed port of the feed tube;

the gas-liquid mixing reactor further comprises a convection mixing jet tube which is in communication with the outlet of the gas-liquid mixing tube and the carbonization reaction tank, the convection mixing jet tube is provided below the gas-liquid mixing tube, and the convection mixing jet tube is provided with a forward flow mixer and a reverse flow mixer sequentially from top to bottom;

the pyrolysis device comprises the pyrolysis kettle and a vacuum pump, the vacuum pump is in communication with the pyrolysis kettle, and the first recovery pipeline is in communication with the gas outlet of the pyrolysis kettle and the gas inlet of the carbon dioxide capture device; wherein a decomposition mother liquor generated via pyrolysis reaction in the pyrolysis device returns to the liquid inlet of the digestion device through the decomposition mother liquor return pipeline; and the secondary calcination device comprises a secondary calciner whose flue gas outlet is in communication with the gas inlet of the carbon dioxide capture device through the second recovery pipeline.

2. The treatment system for deep utilization of dolomite resources according to claim 1, wherein the pyrolysis kettle is provided with a helical ribbon agitator preventing material deposition and wall attachment.

3. The treatment system for deep utilization of dolomite resources according to claim 1, wherein the carbon dioxide capture device further comprises a compression temporary storage gas tank assembly and a carbon dioxide circulation sub system;

the gas inlet of the compression temporary storage gas tank assembly is in communication with the exhaust chamber through the exhaust pipe, and the compression temporary storage gas tank assembly comprises the first gas outlet and the second gas outlet;

the carbon dioxide circulation subsystem comprises a gas transmission pipeline, a first recovery pipeline, a second recovery pipeline, a carbon dioxide water vapor recovery pipeline and a gas-liquid separator;

wherein the carbon dioxide water vapor recovery pipeline is in communication with the flue gas outlet of the pyrolysis kettle and the gas inlet of the gas-liquid separator, and the gas outlet of the gas-liquid separator is in communication with the gas inlet of the carbon dioxide capture device.

4. A method for utilization of dolomite resources by adopting a treatment system for deep utilization of dolomite resources by providing:

a primary calcination device, a carbon dioxide capture device, a digestion device, a carbonization separation device, a pyrolysis device and a secondary calcination device;

wherein the primary calcination device comprises a dolomite calciner performing the indirect calcination of dolomite, a plurality of hoardings and an exhaust pipe, and the dolomite calciner comprises a blanking bin, a furnace body and material discharge bins sequentially provided from top to bottom;

the furnace body is covered with a thermal insulation layer on its outer wall; the blanking bin is provided above a feed port of the furnace body; a blanking port of the blanking bin is correspondingly provided through the feed port; the blanking port has a smaller size than the feed port; the feed port is used simultaneously as an exhaust port of the furnace body;

an exhaust chamber is formed between the plurality of hoardings, the top of the furnace body and the outer wall of a blanking bin; the feed inlet of the dolomite calciner, the blanking port of the blanking bin and an exhaust port of the dolomite calciner are all in communication with the exhaust chamber which is in communication with the gas inlet of the carbon dioxide capture device through the exhaust pipe; the exhaust chamber is in communication with the interior of the furnace body through a feed port;

wherein the blanking bin comprises a plurality of blanking hoppers, each of which is provided with one blanking port; sealing connection is formed between the side wall top ends of two adjacent blanking hoppers, and between the blanking hoppers and the plurality of hoardings;

the material discharge bins are provided with circulating water cooling assemblies on their outer walls; a hot water outlets of the circulating water cooling assemblies are in communication with a water bath hot water inlet of a pyrolysis kettle through a circulating water return pipeline, and a heated circulating water is used for heat supply to the pyrolysis kettle;

the carbon dioxide capture device comprises a first gas outlet, a second gas outlet, a recovery system, a first recovery pipeline and a second recovery pipeline, and the second gas outlet is in communication with the recovery system;

the carbonization separation device comprises a carbonization reaction tank whose gas inlet is in communication with the carbon dioxide capture device through the first gas outlet;

the carbonization separation device further comprises a gas-liquid mixing reactor and a circulating pump;

the carbonization reaction tank is provided with a feeding port and a gas circuit circulation outlet at its top, and is provided with a water circuit circulation outlet and a drain port at its bottom; and a drain valve is installed at the drain port;

the gas-liquid mixing reactor comprises a gas-liquid mixing tube, a feed tube and a gas jet tube; wherein the gas-liquid mixing tube is installed inside the carbonization reaction tank, and is provided with a gas jet tube installation port in its side wall upper part; and the lower end of the gas-liquid mixing tube is configured to be in communication with the interior of the carbonization reaction tank;

the feed tube sequentially passes through the top of the carbonization reaction tank and a seal from top to bottom, and then extends into the interior of the gas-liquid mixing tube; and the material outlet of the feed tube is located below the gas jet tube installation port;

the gas inlet of the gas jet tube is simultaneously in communication with the first gas outlet and the gas circuit circulation outlet, and the exhaust port of the gas jet tube is installed at the gas jet tube installation port;

the liquid inlet of the circulating pump is in communication with the water circuit circulation outlet, and the liquid outlet of the circulating pump is in communication with the feed port of the feed tube;

the gas-liquid mixing reactor further comprises a convection mixing jet tube which is in communication with the outlet of the gas-liquid mixing tube and the carbonization reaction tank, the convection mixing jet tube is provided below the gas-liquid mixing tube, and the convection mixing jet tube is provided with a forward flow mixer and a reverse flow mixer sequentially from top to bottom;

the pyrolysis device comprises the pyrolysis kettle and a vacuum pump, the vacuum pump is in communication with the pyrolysis kettle, and the first recovery pipeline is in communication with the gas outlet of the pyrolysis kettle and the gas inlet of the carbon dioxide capture device; wherein a decomposition mother liquor generated via pyrolysis reaction in the pyrolysis device returns to the liquid inlet of the digestion device through the decomposition mother liquor return pipeline; and the secondary calcination device comprises a secondary calciner whose flue gas outlet is in communication with the gas inlet of the carbon dioxide capture device through the second recovery pipeline.

5. The method for utilization of dolomite resources according to claim 4, further comprising the following step: when dolomite in the primary calcination device is heated to 600-700° C., starting the carbon dioxide capture device to recover and recycle carbon dioxide.

6. The method for utilization of dolomite resources according to claim 4, further comprising one or more of the following steps:

adding inhibitor to the digestion device, wherein the inhibitor comprises one or more of ethylene diamine tetraacetic acid, sodium hexametaphosphate, polyacrylic acid, hydrolyzed polymaleic anhydride and nitrilotriacetic acid;

adding dispersant to calcium-containing heavy magnesium aqueous solution, wherein the dispersant comprises one or more of methanol, alcohol, glycerin, polyacrylamide, cellulose derivatives and water glass;

digesting a first batch of calcined white powder in the digestion device with 50-80° C. water, and digesting other batches of calcined white powder with an uncooled decomposition mother liquor;

wherein the solid-liquid ratio of the calcined white powder to the water or the decomposition mother liquor in the digestion device is 1 kg: 10-30 L; and maintaining a negative pressure state in the pyrolysis kettle, so that the boiling point of calcium-containing heavy magnesium aqueous solution in the pyrolysis kettle is between the pyrolysis temperature of magnesium bicarbonate and the pyrolysis temperature of calcium bicarbonate.

\* \* \* \* \*